United States Patent [19]
Jackson

[11] 3,922,460
[45] Nov. 25, 1975

[54] GASKET WITH PLASTIC MOLDING

[75] Inventor: Norman C. Jackson, Sheffield Lake, Ohio

[73] Assignee: The Standard Products Company, Cleveland, Ohio

[22] Filed: Apr. 26, 1971

[21] Appl. No.: 137,708

[52] U.S. Cl. .............. 428/217; 428/164; 428/192
[51] Int. Cl.² ........................................ B32B 7/02
[58] Field of Search ..................... 161/117–124, 161/126, 127, 138, 149, 44; 49/495, 497, 498; 52/624, 627, 628, 670, 672, 671, 312; 428/164, 192, 217

[56] References Cited
UNITED STATES PATENTS

| | | | |
|---|---|---|---|
| 2,990,306 | 6/1961 | Dyer | 161/408 X |
| 3,167,856 | 2/1965 | Zoller | 29/413 |
| 3,419,458 | 12/1968 | Brooks et al. | 161/121 |
| 3,436,297 | 4/1969 | Brooks et al. | 161/119 |
| 3,471,355 | 10/1969 | Truesdell et al. | 161/106 X |
| 3,681,180 | 8/1972 | Kent | 161/5 |

FOREIGN PATENTS OR APPLICATIONS 1,014,924  12/1965  United Kingdom.............. 161/117

*Primary Examiner*—William A. Powell
*Attorney, Agent, or Firm*—Meyer, Tilberry & Body

[57] ABSTRACT

A decorative strip structure is disclosed which includes a base portion of non-metallic, flexible material and a trim portion of non-metallic flexible material secured to the base portion. The base portion may be provided with integral means for mounting the strip structure on a supporting surface therefor. The trim portion of the strip structure has an outer surface which is provided wtih a covering of metallized polyethylene terephthalate which tends to craze or wrinkle upon bending of the strip structure. The non-metallic material of the trim portion is of a hardness such that the material will support the metallized layer so as to prevent crazing or wrinkling thereof upon bending of the strip structure, and the material of the base portion is of a lesser hardness to facilitate bending of the overall strip structure.

3 Claims, 3 Drawing Figures

INVENTOR.
NORMAN C. JACKSON
BY
Meyer, Tilberry & Body
ATTORNEYS.

GASKET WITH PLASTIC MOLDING

The present invention relates to strip structures and, more particularly, to strip structures adapted to serve as sealing gaskets and/or trim strips for articles on which the strip structures are mounted.

Non-metallic strip structures have been provided heretofore for the purpose of providing decorative trim or decorative sealing strips mountable on an underlying support component. Such strip structures are extensively used by the automotive industry as interior and exterior trim and as decorative sealing strips between adjacent wall surfaces of a vehicle, such as is defined by a wall panel adjacent a window opening and a glass pane in the window opening.

In order for strip structures of the above character to be acceptable for use by the automotive industry, several requirements must be met with regard to construction of the strips. These requirements include that the strip structure simulate the appearance of a polished stainless steel or the appearance of other types of materials such as wood paneling. Another requirement is that the strip structure must be capable of being readily formed such as by bending to a desired contour corresponding to that of a surface to which it is to be mounted, and sucn bending or contouring of the strip must be achieved without any loss in the decorative effect thereof. In certain instances the strip structures are mounted on an underlying support component by providing for portions of the strip structure to resiliently grip the support component. Thus, bending of the structure must be achievable without loss of the ability of the strip to adequately grip the support component. Still further, with regard to sealing strip structures, the strips must be sufficiently flexible or resilient to provide adequate sealing engagement thereof with underlying surfaces of the vehicle when the strips are bent or curved.

The foregoing requirements of strip structures are advantageously achieved in accordance with the present invention wherein there is provided a strip structure constructed in a manner whereby the overall strip has suffficient resliency to permit the strip to be readily bent and to conform to the contour of a surface to which it is to be attached, and wherein the strip structure includes a decorative trim portion which is sufficiently resilient to permit bending thereof to the desired contour without disfiguration or destruction of the decorative effect thereof. In this respect, a strip structure is provided which includes a base portion of non-metallic material having sufficient flexibility to permit readily bending the material to conform to a desired contour. A trim element is attached to the base portion and is comprised of a non-metallic material having an outer surface which is provided with means defining a particular decorative effect sought such as, for example, the appearance of a metal strip. Such a decorative effect may be achieved in a number of various ways, one of which is to provide the outer surface of the trim portion with a thin film of metallized polyethylene terephthalate, commonly known as Mylar. Such a decorative effect could, of course, also be achieved by applying a thin film of metal foil to the outer surface of the trim portion and covering the metal film with a thin film of clear plastic material. Such decorative surfaces, as well as many others which are often used in trim construction, are subject to disfiguration caused by crazing, wrinkling or the like upon bending of the trim portion unless the underlying non-metallic body of the trim portion provides sufficient support for the decoratie surface. In accordance with the present invention, such disfiguration is avoided by providing for the non-metallic material of the trim portion to be of a sufficient hardness to adequately support the decorative surface so that the trim portion of the strip structure can be readily bent along an arc of relatively short radius without disfiguration.

The base portion of the strip structure supports the trim portion and usually is provided with means by which the strip structure may be mounted on an underlying support component. Depending on the particular use intended for the strip structure, the base structure will vary in configuration. In this respect, the base may, in cross-sectional configuration, be many times greater in size than the trim portion, or may be of a configuration which makes bending thereof extremely difficult. It is desirable for mounting and/or sealing purposes, as mentioned hereinbefore, that the overall strip structure be as resilient as possible to permit bending thereof, and at the same time the trim portion must be bendable without disfiguration by crazing, wrinkling or the like of the decorative surface theren. In accordance with the present invention, both of these features are advantageously achieved by providing for the base portion to be of a non-metallic material which is of less hardness than the hardness of the plastic material of the trim portion. Thus, a desirable degree of resiliency is provided for the overall strip structure which permits bending of the strip structure to configurations including short radius bends and which provides for such bending to be achieved without distortion of the base resulting in loss of the ability of the base portion to seal against an underlying surface or resiliently grip a mounting support for the structure and without disfiguration of the decorative surface of the trim portion of the overall strip structure.

Accordingly, it is an outstanding object of the present invention to provide a non-metallic strip structure including a base and decorative surface means and which is adapted to be readily formed to a given contour corresponding to that of underlying support means without undesirable distortion or disfiguration of the base and decorative surface means.

Another object of the present invention is the provision of a trim strip structure comprising a base portion and a decorative trim portion which is adapted to be bent to conform to a desired contour without disfiguration of the decorativeness provided by the trim portion.

A further object of the present invention is to provide a strip structure comprised of a base portion and a trim portion, both of which are of flexible, non-metallic composition and wherein the hardness of the material of the trim portion is greater than the hardness of the material of the base portion.

Still another object of the present invention is the provision of a strip structure comprised of a base portion of vinyl material and a trim portion of vinyl material attached thereto and wherein the trim portion is provided with decorative surface means and wherein the vinyl material of the trim portion is harder than the vinyl material of the base portion, thus for the material of the trim portion to support the decorative surface in a manner whereby the latter is not disfigured in response to bending of the strip structure.

Yet another object of the invention is the provision of a strip structure of the above character wherein the base portion is soft enough to provide for the strip structure to be bent to a desired configuration and for portions of the base to sealingly engage surface means thereunder when the strip structure is in a mounted position.

Still a further object is the provision of a strip structure of the above character which is both decorative in appearance and economical to produce.

Other objects will in part be obvious and in part more fully pointed out hereinafter in conjunction with the description of the drawing in which.

Figures 1, 2, 3:
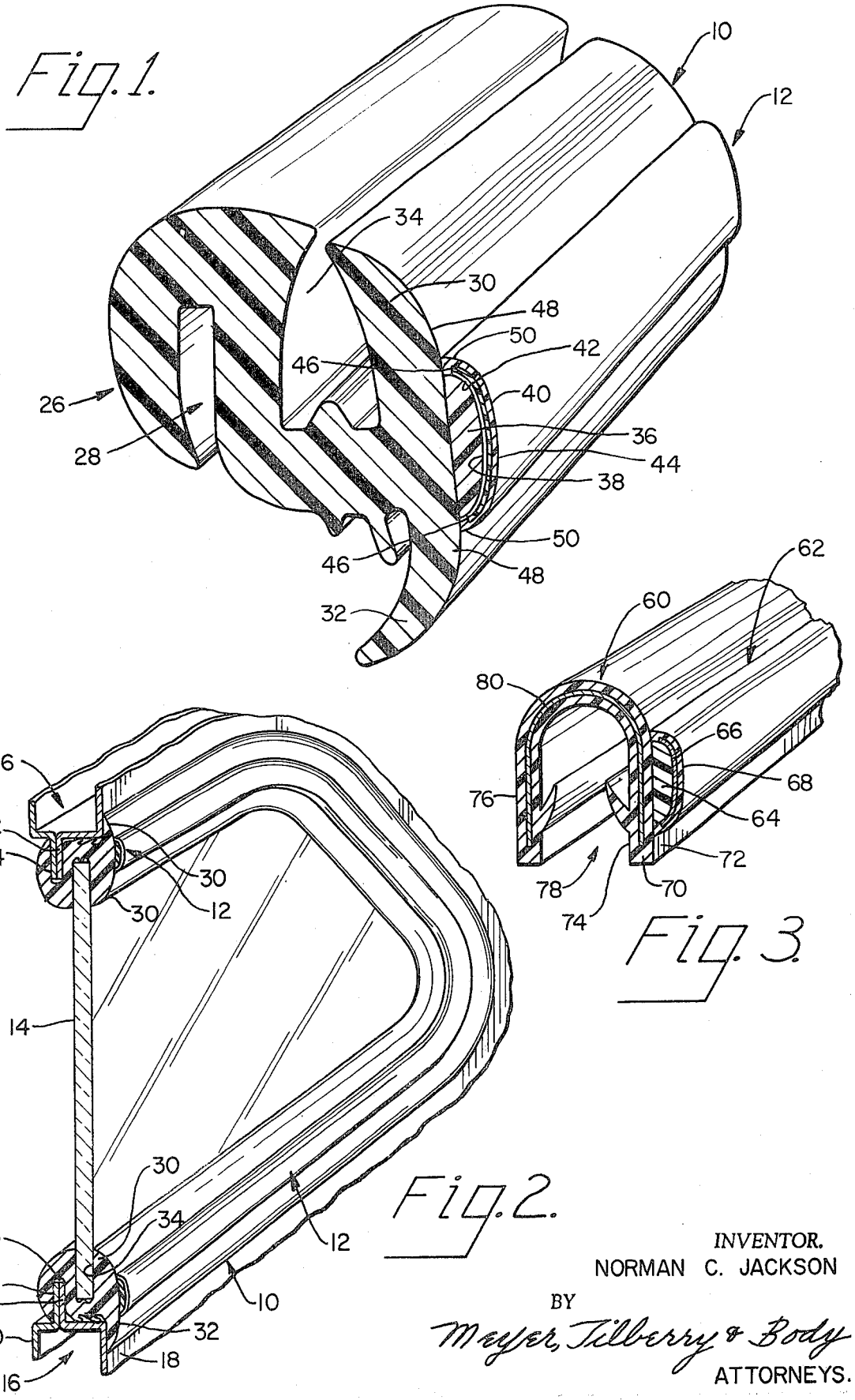
FIG. 1 is a perspective view, partially in section, of a strip structure within the present invention.
FIG. 2 is a perspective view, partially in section, of the strip structure of FIG. 1, illustrating the structure in mounted relationship with respect to a vehicle window frame and window pane.
FIG. 3 is a perspective view, partially in section, of another embodiment of strip structure within the present invention.

Referring now to the drawing in greater detail wherein the showings are for the purpose of illustrating the preferred embodiments of the invention only and not for the purpose of limiting the same, there is illustrated in FIGS. 1 and 2 a strip structure comprised of a base portion 10 and a trim portion 12. In this particular embodiment, the strip structure defines a decorative sealing strip or gasket for mounting a window pane 14 in a fixed position with respect to an opening therefor provided in a vehicle body and which opening is outlined by window frame means 16. In this respect, an outer wall panel 18 of a vehicle and an inner wall panel 20 of the vehicle are configured to provide corresponding flange components 22 and 24, respectively, defining a window opening. Base portion 10 of the strip structure is provided with mounting means 26 which is integral therewith and which includes a channel portion 28 adapted to receive flange means 22 and 24 to retain the strip structure in place relative to the window opening. The base portion further includes side portions 30 and 32 and a channel portion 34. Channel 34 is adapted to receive the peripheral edge of window pane 14, and side potions 30 and 32 are adapted to sealingly engage pane 14 and wall panel 18, respectively, when the strip structure is mounted in the window opening. Side portions 30 and 32 of base 10 are configured as illustrated in FIG. 1 so that these portions will be distended when the strip structure is in the mounted position, thus to assure sufficient sealing engagement thereof with the window pane and vehicle wall panel. Base portion 10, and attaching means 26 which is integral therewith, may be any suitable elastomeric material such as vinyl and preferably is of a vinyl nitrile composition. The base portion and attaching means may be most economically produced by extrusion.

Trim portion 12 is comprised of a body 36 of a vinyl polymeric material and preferably is extruded polyvinyl chloride. Body portion 36 has an outer surface 38 which is slightly arcuate in contour in the embodiment illustrated, but which may be otherwise configured. Surface 38 carries decorative means in the form of a thin film 40 of plastic material provided on one side thereof with decorative surface means. In the particular embodiment illustrated, film 40 is a thin film of polyethylene terephthalate, commonly known as Mylar, and is provided on its underside with a metallic coating 42. coating 42 may be provided, for example, by vapor deposition of a metal such as aluminum on the surface of the Mylar film. The Mylar film is, of course, clear so that the decorativeness of the metal coating is visible therethrough. The metallized Mylar film may be suitably secured to vinyl body 36 such as by adhesive bonding or heat sealing.

The metallized Mylar is subject to color deterioration by exposure to ultra-violet radiation and, accordingly, a protective plastic film 44 preferably is provided in overlying relationship with respect to film 40. Further, it is preferred that the side edges of film 40 be shielded from exposure and, accordingly, side edges 46 of film 40 terminate a short distance from the outer surface 48 of base portion 10 and the side edges 50 of film 44 extend below side edges 46 of film 40 and are heat sealed or otherwise bonded to the material of body portion 36 of trim portion 12. Protective film 44 preferably is a polyvinyl chloride composition containing ultra-violet absorbers which provide for the film to shield the metallized Mylar film from the effects of ultra-violet radiation. In this respect, the polyvinyl chloride film may contain ultra-violet absorber additives such as Benzophenons, Benzotriazoles, substituted acryonitriles, for example. It is to be clearly understood, however, that outer film 44 may be eliminated, and that films other than treated polyvinyl chloride may be used as a protective film. In this respect, the protective film may be of polyvinyl fluoride composition, commonly known as Tedlar. Film 44, of course, is clear and transparent, whereby the metallic effect of the metallized Mylar film is visible therethrough. Film 44, in addition to protecting the metallized Mylar from the effects of ultraviolet radiation also desirably increases the cornering or bending ability of the metallized Mylar.

Trim portion 12 may be interconnected with base portion 10 in any suitable manner such as adhesive bonding, separate fastener means or fastener means integral with one of the two components and interengaged with cooperable fastening means on the other of the components. Preferably, however, the vinyl material of the trim portion 12 is heat sealed to the vinyl material of base portion 10 to define an integral bond therebetween. Such heat sealing may be achieved in any suitable manner and, for example, may be achieved by heating base portion 10 and trim portion 12 and bringing the two portions together while heated and with pressure applied therebetween. Further, base portion 10 and trim portion 12 may both be produced by extrusion and, if so, the two components can be brought together immediately following the extrusion operation and while both components are still hot to achieve the desired bonding.

It will be appreciated that base portion 10 must have sufficient resiliency to provide for the strip structure unit to be bent to conform to the contour of the window opening in a manner whereby the walls of channel 28 adequately grip flanges 22 and 24 and side portions 30 and 32 of the base portion are in adequate sealing engagement with window pane 14 and wall panel 18 of the vehicle. If the material of the base portion is too hard, base 10 will be distorted in response to bending to the extent that the sealing and gripping engagement is not adequate. On the other hand, if body portion 36 of trim portion 12 is of the softness desired to provide the sought resiliency for base portion 10, the trim portion will readily bend to conform to the contour of the window opening, but the decorative surface means provided by metallized film 40 will not be adequately supported and will be inclined to wrinkle or craze in the areas of the bend of the strip structure, especially if such bends are of short radius. Such disfiguration by crazing or wrinkling results from the body material being insufficiently hard to adequately support the decorative film in a manner to prevent the film from wrinkling or crazing. Thus, in accordance with the present invention, body portion 36 of trim portion 12 is produced from a vinyl polymeric composition having a hardness greater than that of base portion 10. A strip structure is thus provided wherein the different requirements concerning the characteristics of resiliency and hardness of the base portion and trim portion are provided for and in a manner whereby undesirable characteristics of the components relative to one another are avoided.

More particularly, in accordance with the present invention, the trim portion is a vinyl polymeric composition having a Durometer hardness of between 85 to 99 as measured on the Shore A scale, 15 second delay method, at ambient temperature. The base portion, in accordance with the present invention is a vinyl composition having a Durometer hardness of between 50 to 80 as measured on the Shore A scale, 15 second delay method, at ambient temperature. Hardnesses within these ranges have been found to permit short radius bending of the strip structure in a manner whereby the resilient characteristics of the base portion are retained and wrinkling and crazing of the decorative surface means is avoided. The relative hardnesses of the base and trim portions will vary depending on the resiliency requirements of the base portion, the relative cross sectional dimensions of the base and trim portions and the degree or angle of bends to be imparted to the strip structure. Preferably, the trim portion has a hardness at least 10 Durometer points greater than the base portion.

In the specific embodiment illustrated in FIGS. 1 and 2, body portion 36 of trim portion 12 is polyvinyl chloride having a Durometer hardness of between 85 to 90 as measured on the Shore A scale, 15 second delay method, at ambient temperature, and base 10 is a vinyl or preferably a vinyl nitrile composition having a hardness of between 50 to 80 as measured on the Shore A scale, 15 second delay method, at ambient temperature. Base 10 can also be a vinyl chloride polymer, copolymer, or elastomeric mixture.

With further regard to the embodiment of FIGS. 1 and 2, metallized Mylar film 40 is approximately 0.0005 inch thick and the protective film 44 of polyvinyl chloride is approximately 0.005 to 0.010 inch thick.

In FIG. 3 of the drawing there is illustrated another embodiment of the present invention. In this respect, a strip structure is illustrated which includes a base portion 60 and a trim portion 62. Trim portion 62 is similar to trim portion 12 described hereinabove with regard to the embodiment illustrated in FIGS. 1 and 2, and in this respect, includes a body portion 64 of a vinyl polymeric composition, a thin film 66 of metallized polyethylene terephthalate defining decorative surface means, and an outer protective layer or film 68 of polyvinyl chloride treated so as to protect the metallized film from the effects of ultra-violet radiation. Base portion 60 in this instance, includes a body portion 70 of flexible non-metallic material, preferably a vinyl composition. Body portion 64 of trim portion 62 is heat sealed to outer surface 72 of base portiion 60. Base portion 60 is of U-shaped channel configuration including legs 74 and 76 which are spaced apart to define a recess 78 adapted to receive support means for the strip structure. Further, base portion 60 may be provided with a metallic core component 80 embedded in the material of the base portion to rigidify the latter.

A strip structure of the character illustrated in FIG. 3 is adapted to be mounted on a peripheral edge of a panel or the like and, depending on the peripheral configuration of a given panel, will be bent in directions both lateral to and in the plane of legs 74 and 76. It will be appreciated that bends of the strip structure in planes parallel to legs 74 and 76 impose stresses on the material of the base portion which make such bends extremely difficult to achieve without distortion of the base portion in a manner whereby the latter does not grip the opposed faces of the panel to the extent desired. Further, as mentioned hereinabove with regard to trim portion 12 of the strip structure illustrated in FIGS. 1 and 2, the decorative surface means of trim portion 62 defined by metallized film 66 is subject to disfiguration by wrinkling or crazing upon bending of the strip structure if the decorative film is not adequately supported by body portion 64 of the trim portion to prevent such disfiguration. The foregoing undesirable characteristics are avoided in accordance with the present invention by providing for the body portion 70 of base portion 60 to be of a elastomeric material which is soft enough to permit bending thereof to the configuration desired without undue distortion of the base portion so that the latter will adequately grip the underlying surfaces of the panel or the like on which the strip structure is mounted. At the same time, body portion 64 of trim portion 62 is produced from a nonmetallic material having a hardness which is greater than the hardness of body portion 70 of base portion 60 and which is sufficient to support decorative film 66 so as to prevent disfiguration of the decorative surface means thereon by wrinkling or crazing upon bending of the strip structure.

In the embodiment of FIG. 3, body portion 64 preferably is a polyvinyl chloride having a Durometer hardness of between 85 to 99 on the Shore A scale, 15 second delay method, at ambient temperature. Further, the material 70 of base portion 60 preferably is vinyl having a Durometer hardness between 60 to 85 on the Shore A scale, 15 second delay method, at ambient temperature. As mentioned hereinabove, trim portion 62 preferably is heat sealed to outer surface 72 of body portion 70 of base portion 60. It is to be understood, however, that base portion 60 and trim portion 62 may be otherwise suitably interconnected, such as by adhesive bonding, the use of separate fastening elements, or the provision of fastening component means integral with one of the base and trim portions and interengaging with cooperable fastening component means on the other of the base and trim portions.

As many possible embodiments of the present invention may be made, and as many possible changes may be made in the embodiments herein described, it is to be distinctly understood that the foregoing description of certain preferred embodiments is to be interpreted merely as illustrative of the present invention and not as a limitation.

I claim:

1. A strip structure comprising a vinyl base portion having an outer surface, and a vinyl trim portion heat sealed to said outer surface of said base portion and having an outer surface, a film of transparent polyethylene terephthalate bonded to and having a metallized surface facing said outer surface of said trim portion, said metallized surface being subject to disfiguration upon bending of said strip structure, said vinyl of said trim portion having a Durometer hardness of from 85 to 99 on the Shore A scale, 15 second delay method to prevent disfiguration of said metallized surface upon bending of said strip structure, and said vinyl of said base portion having a Durometer hardness of from 50 to 80 on the Shore A scale, 15 second delay method.

2. The strip structure of claim 1, and a thin plastic film overlying and adhered to said film of polyethylene terephthalate and having ultra-violet light absorbing ability.

3. The strip structure of claim 2, wherein said film of polyethylene terephthalate has sides edges terminating in spaced relationship to said outer surface of said base portion, said thin plastic film having side edges extending beyond said side edges of said film of polyethylene terephthalate and bonded to said vinyl trim portion.

* * * * *